(12) United States Patent
Mei et al.

(10) Patent No.: US 11,352,952 B2
(45) Date of Patent: Jun. 7, 2022

(54) VENTING SYSTEM FOR BEARING SUMP

(71) Applicant: NUOVO PIGNONE TECNOLOGIE—S.R.L., Florence (IT)

(72) Inventors: Luciano Mei, Florence (IT); Francesco Caratelli, Florence (IT); Alessandro Russo, Florence (IT); Massimiliano Mariotti, Florence (IT); Alberto Ceccherini, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 0 days.

(21) Appl. No.: 17/251,269

(22) PCT Filed: Jun. 14, 2019

(86) PCT No.: PCT/EP2019/025183
§ 371 (c)(1),
(2) Date: Dec. 11, 2020

(87) PCT Pub. No.: WO2019/242888
PCT Pub. Date: Dec. 26, 2019

(65) Prior Publication Data
US 2021/0270184 A1    Sep. 2, 2021

(30) Foreign Application Priority Data

Jun. 18, 2018 (IT) .................. 102018000006394

(51) Int. Cl.
*F02C 3/10* (2006.01)
*F01D 25/16* (2006.01)
*F02C 7/06* (2006.01)

(52) U.S. Cl.
CPC .............. *F02C 3/10* (2013.01); *F01D 25/162* (2013.01); *F01D 25/168* (2013.01); *F02C 7/06* (2013.01);
(Continued)

(58) Field of Classification Search
None
See application file for complete search history.

(56) References Cited

U.S. PATENT DOCUMENTS 3,844,110 A * 10/1974 Widlansky ................ F02C 7/06
                                                       60/39.08
9,488,102 B2 * 11/2016 Santini ...................... F02C 3/10
(Continued)

FOREIGN PATENT DOCUMENTS

JP      2006161813 A    6/2006
WO    2014/176178 A1   10/2014

*Primary Examiner* — Todd E Manahan
*Assistant Examiner* — Thuyhang N Nguyen
(74) *Attorney, Agent, or Firm* — Baker Hughes Patent Org.

(57) ABSTRACT

The gas turbine engine comprises a gas generator (66), comprised of a compressor section (11), and a power turbine section (65). The power turbine section (65) comprises a power turbine rotor (81) supported by a power turbine shaft (93), which is mechanically uncoupled from the gas generator (66). The power turbine shaft (93) has an axial cavity (511) therein, fluidly coupled to a bearing sump (521) fluidly coupled to the compressor section (11) and housing at least one bearing (106) supporting a shaft of the gas generator (66). An air venting path (527) extends from said axial cavity (511) and leads in a combustion gas flow path (515) downstream of the power turbine rotor (81).

9 Claims, 4 Drawing Sheets

(52) U.S. Cl.
CPC .. *F05D 2260/602* (2013.01); *F05D 2260/605* (2013.01)

(56) References Cited

U.S. PATENT DOCUMENTS

| | | | |
|---|---|---|---|
| 10,781,751 B1* | 9/2020 | Jones | B64C 39/024 |
| 2006/0120854 A1 | 6/2006 | Wakeman et al. | |
| 2007/0039330 A1* | 2/2007 | Bladon | F01D 25/22 |
| | | | 60/785 |
| 2009/0193783 A1* | 8/2009 | Siden | F02C 6/00 |
| | | | 60/39.15 |
| 2010/0104418 A1* | 4/2010 | Weidmann | F01D 5/082 |
| | | | 415/111 |
| 2010/0293967 A1* | 11/2010 | Liskow | F25J 1/0022 |
| | | | 62/6 |
| 2014/0075951 A1 | 3/2014 | Muldoon et al. | |
| 2014/0256494 A1* | 9/2014 | Lewis | F01D 25/18 |
| | | | 475/159 |
| 2015/0337681 A1* | 11/2015 | Scott | F02C 7/20 |
| | | | 415/111 |
| 2016/0102580 A1 | 4/2016 | Betancourt et al. | |
| 2016/0160928 A1 | 6/2016 | Gallimore | |

* cited by examiner

VENTING SYSTEM FOR BEARING SUMP

TECHNICAL FIELD

The present disclosure concerns gas turbine engines. Embodiments disclosed herein specifically concern gas turbine engines having a gas generator and a free power turbine section.

BACKGROUND ART

Gas turbine engines are extensively used as prime movers for driving rotating machinery, both in electric generation as well as in mechanical drive applications. As understood herein, electric generation applications are those applications wherein electric generators are driven by a gas turbine engine. These systems convert chemical energy of a fuel into useful electric energy. As understood herein mechanical drive applications are those applications wherein gas turbine engines drive rotating equipment other than electric generators, for instance pumps or compressors, such as single-stage or multi-stage axial or centrifugal compressors.

In some applications, the compactness of the gas turbine engine system becomes critical. Specifically, in offshore applications, where the gas turbine engines and the machinery driven thereby are installed on a floating vessel or on an offshore platform, there is a need to reduce the overall footprint of the mechanical equipment, since the space available is small. High power density is therefore important.

Aeroderivative gas turbine engines are compact machines and thus particularly desirable in offshore applications. As commonly understood in the art of gas turbine engines and as used herein, the term aeroderivative gas turbine engine is used to designate a gas turbine engine which at least partly uses equipment which has been designed for aircraft transportation. These gas turbine engines are characterized by compactness and reduced weight. However, these machines have some limitations in terms of availability and power rate.

One of the critical aspects in gas turbine engines concern the bearing design. High power rates involve high axial loads on the turbine shafts, which in turn requires the use of complex bearings, such as fluid bearings, which have higher load carrying capacity than rolling bearings, for instance. Such bearings are complex, cumbersome and require complicated bearing fluid circuits.

It would thus be desirable to develop a gas turbine engine, which overcomes or alleviates one or more of the limitations of the current art.

SUMMARY

According to one aspect, disclosed herein is an aeroderivative gas turbine engine comprising a gas generator and a power turbine section. The power turbine section comprises a power turbine rotor supported by a power turbine shaft rotatingly arranged in a turbine casing. The power turbine shaft is mechanically uncoupled from the gas generator, i.e. can rotate at a rotation speed different from the rotation speed of the gas generator shaft(s). The power turbine shaft has an axial cavity, fluidly coupled to a bearing sump, which houses at least one bearing supporting the shaft of the gas generator. The bearing sump is fluidly coupled to the compressor section of the gas generator and is flushed with compressed air therefrom. An air venting path extends from said axial cavity and leads in a gas flow path downstream of the power turbine rotor.

According to another aspect, disclosed herein is a method of operating a gas turbine engine, comprising the following steps:

operating a gas generator of the gas turbine engine, the gas generator comprising at least a rotary shaft supported by at least one bearing arranged in a bearing sump, and generating combustion gas therewith;

expanding the combustion gas in a power turbine section, comprising a power turbine rotor supported by a power turbine shaft;

flushing the bearing sump with compressed air from a compressor section of the gas generator; and venting the air from the bearing sump into an axial cavity of the power turbine shaft and through a venting path extending from the axial cavity fluidly coupled to a gas path downstream of the power turbine rotor.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

An aeroderivative gas turbine engine is disclosed, which comprises new and useful arrangements aimed at improving venting of a bearing sump and reducing the axial load on the free power turbine shaft. By reducing the axial load on the shaft less performing bearings can be used, In some embodiments, rolling bearings can be used instead of fluid bearings, even in case of higher power rates. The overall footprint and complexity of the gas turbine engine is thus reduced and maintenance is made easier. Improved venting of the bearing cavity improves operability of the engine in off-design conditions.

In general, the gas turbine engine includes a gas generator and a free power turbine section. The gas generator includes a compressor section and a turbine section, as well as a combustor section therebetween. Air compressed by the compressor section is mixed with fuel and ignited in the combustor section to generate hot, pressurized combustion gas. This latter is expanded in one or more turbine wheels of the gas generator, which are drivingly coupled to the compressor section and provide power to drive the compressor section into rotation. The final expansion step is performed in the power turbine section comprising a free power turbine supported by a power turbine shaft, At least one bearing of the gas generator, e.g. the bearing placed nearest to the power turbine section, is arranged in a sump, which is fluidly coupled to an axial cavity of the power turbine shaft and further fluidly coupled to the compressor section of the gas generator to receive compressed air therefrom. By providing an axial cavity in the power turbine shaft, the weight thereof is reduced and the diameter thereof can be made larger than in machines of the current art. The axial cavity is in turn fluidly coupled via a venting path with the combustion gas path, downstream of the power turbine section, where the lowest gas pressure is present. This arrangement promotes venting of the bearing sump and improves the efficiency of the gas turbine engine, also under off-design operating conditions. As will be explained in more detail later on, the increased diameter of the power turbine shaft reduces the axial load on the bearings thereof.

Figure 1:
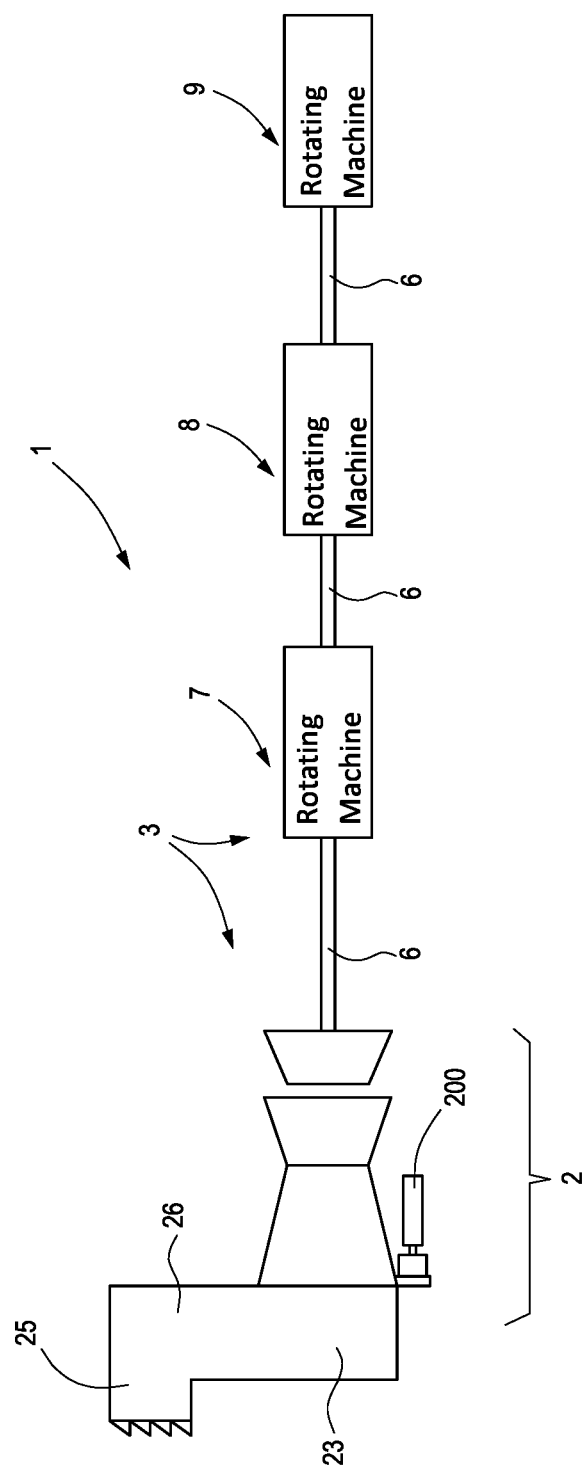
FIG. 1 illustrates a schematic of a system comprising a gas compressor train driven by a gas turbine, according to embodiments disclosed herein.

Turning now to the drawings, FIG. 1 schematically illustrates a system 1 comprising a gas turbine engine 2 and a load 3. In some embodiments the load 3 can include rotating equipment. Exemplary embodiments of the system 1 include a compressor train forming (part of) the load 3. The compressor train 3 can include a shaft line 6 and a plurality of rotating machines arranged there along. In the schematic of FIG. 1, the load 3 includes three rotating machines 7, 8, 9, for instance three gas compressors for processing one or more refrigerant fluids circulating in a refrigerant circuit. The compressors can be part of one and the same closed circuit, for instance a refrigerant circuit of an LNG system. In other embodiments the compressors can belong to two or three different closed circuits, for separately processing respective gas flows, for instance refrigerant flows in an LNG system.

The arrangement of FIG. 1 is provided by example only. It shall be understood that the gas turbine engine 2 can be used to drive a different load, for instance an electric generator. In yet further embodiments the gas turbine engine 2 can be used to drive a compound load, including compressors and electric machines in combination, for instance.

Figure 2:
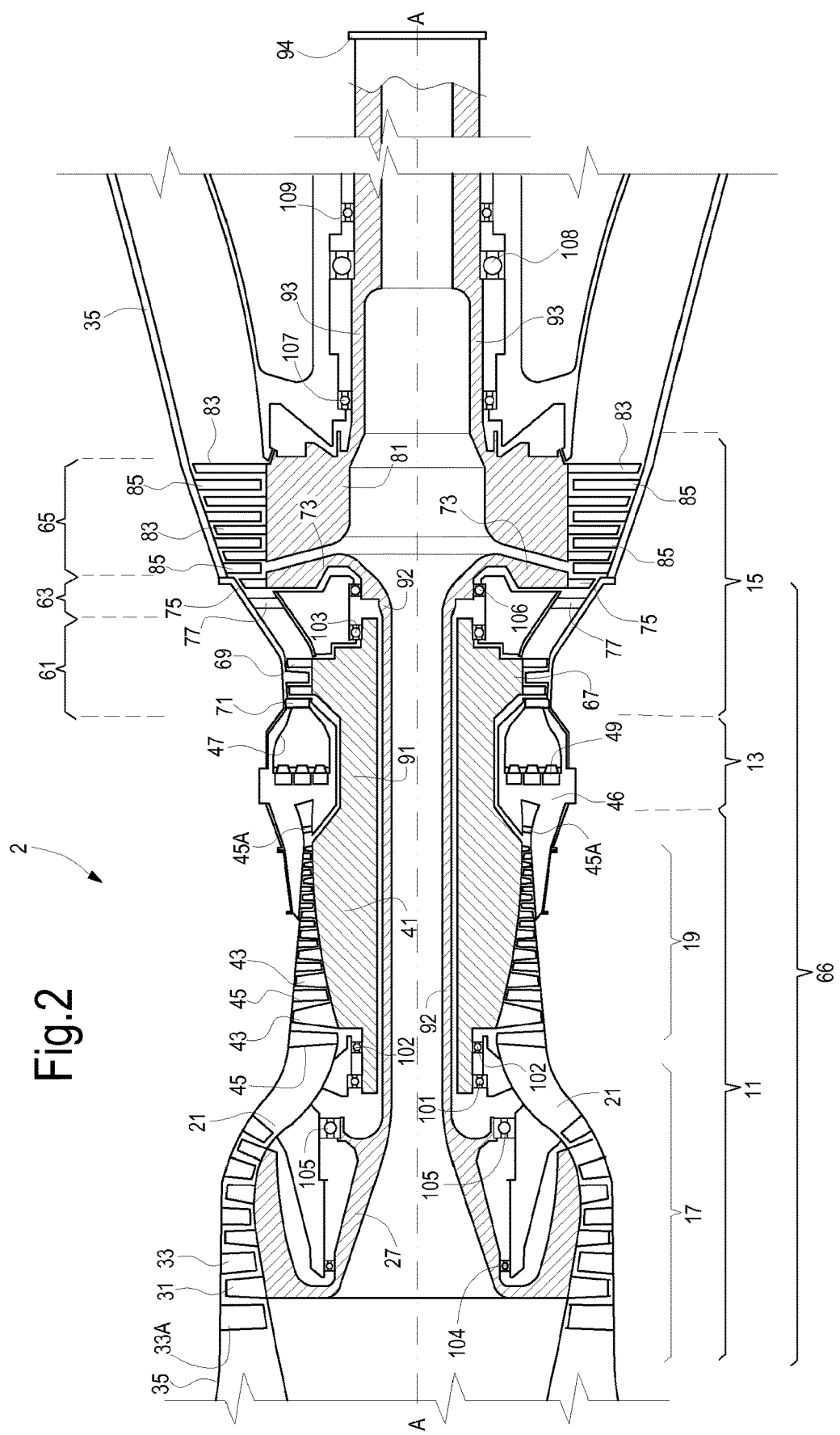
FIG. 2 illustrates a schematic sectional view of a gas turbine engine according to embodiments of the present disclosure.

FIG. 2, with continuing reference to FIG. 1, illustrates a schematic sectional view of an exemplary embodiment of the gas turbine engine 2. The gas turbine engine 2 can include a compressor section 11, a combustor section 13 and a turbine section 15.

According to some embodiments, the compressor section 11 includes in turn a low-pressure compressor section 17 and a high-pressure compressor section 19. The low-pressure compressor section 17 can be fluidly coupled to the high-pressure compressor section 19 through an air flow passage 21. The low-pressure compressor section 17 can be fluidly coupled to an air inlet plenum, which receives ambient air through a filter housing 25 (FIG. 1). The filter housing 25 can be fluidly coupled to the air inlet plenum 23 through a clean-air duct 26. Air can be pre-treated, for instance can be chilled prior to be ingested by the low-pressure compressor section 17. In some arrangements, air is not chilled prior to be delivered to the low-pressure compressor section 17, such that a chilling arrangement and relevant equipment can be dispensed with, which results in a more compact arrangement.

As shown in the schematic of FIG. 2, the low-pressure compressor section 17 can include a low-pressure compressor rotor 27 rotating around a gas turbine axis A-A. The low-pressure compressor rotor 27 can include a plurality of circular arrangements of rotating blades 31. In the exemplary embodiment of FIG. 2, the low-pressure compressor rotor 27 includes four circular arrangements of rotating blades 31, which rotate integrally with the low-pressure compressor rotor 27.

The low-pressure compressor section 17 can further include a plurality of circular arrangements of stationary blades 33, stationarily arranged in a casing 35. Each circular arrangement of stationary blades 33 is combined with a respective one of said circular arrangements of rotating blades 31. Each pair of consecutively arranged rotating blade arrangement and stationary blade arrangement forms a low-pressure compressor stage. In exemplary embodiments disclosed herein the low-pressure compressor section 17 includes four low-pressure compressor stages. A set of inlet guide vanes 33A can also be arranged upstream of the most upstream set of rotating blades 31. A set of stationary blades can be arranged between the low-pressure compressor section 17 and the high-pressure compressor section 19 to straighten the gas flow between the two sections.

In the context of the present specification, the terms downstream and upstream are referred to the direction of an air or gas flow through the machinery, unless differently specified.

The inlet guide vanes 33A can be variable inlet guide vanes, i.e. they can be mounted on the casing 35, pivotally around respective substantially radial pivoting axes. The blades of one, some or all the circular arrangements of stationary blades 33 downstream of the inlet guide vanes 33A can have a variable geometry. A stationary blade of a variable-geometry blade arrangement can be supported on the casing 35 such as to be capable of pivoting around a substantially radial pivoting axis. A "substantially radial pivoting axis" as used herein may be understood as an axis which is oriented substantially orthogonal to the gas turbine axis A-A, i.e. the axis around which the rotating parts of the gas turbine engine 2 rotate.

According to embodiments disclosed herein the high-pressure compressor section 19 can include a high-pressure compressor rotor 41 arranged for rotation around gas turbine axis A-A, and therefore coaxial to low-pressure compressor rotor 27. The high-pressure compressor rotor 41 can include a plurality of circular arrangements of rotating blades 43. In the exemplary embodiment of FIG. 2, the high-pressure compressor rotor 41 includes nine circular arrangements of rotating blades 43, which rotate integrally with the low-pressure compressor rotor 41.

The high-pressure compressor section 19 can further include a plurality of circular arrangements of stationary blades 45, stationarily arranged in the casing 35. A circular arrangement of stationary blades 45 is combined with each circular arrangement of rotating blades 43. Each pair of consecutively arranged stationary blade arrangement and rotating blade arrangement forms a high-pressure compressor stage.

A final set of output guide vanes 45A can be further provided downstream of the high-pressure compressor stages in order to straighten the flow at the outlet of the high-pressure compressor section 19.

The blades of one, some or all the circular arrangements of stationary blades 45 of the high-pressure compressor section 19 can have a variable geometry. In some embodiments, none of the stationary blades arrangement has a variable geometry. Also in the high-pressure compressor section 19, as in the low-pressure compressor section 17, each stationary blade of a variable-geometry blade arrangement can be supported on the casing 35 such as to be capable of pivoting around a substantially radial pivoting axis.

The high-pressure compressor section 19 is fluidly coupled to the combustor section 13 through the set of stationary blades 45A and a high-pressure air flow passage 46.

The combustor section 13 can include an annular combustion chamber 47. In some embodiments, a plurality of fuel nozzles 49 are annularly arranged along the annular combustion chamber 47 and around the gas turbine axis A-A. In preferred embodiments, the combustor section 13 includes a dry-low-emission system, commonly named DLE system in the art. The dry-low emission system provides for a reduction of noxious CO and/or NOx emissions without the need for adding water in the combustion chamber.

In some embodiments the combustor section can include a diffusion combustor.

Compressed air delivered by the high-pressure compressor section 19 is mixed with a gaseous or liquid fuel and the air/fuel mixture is ignited in the combustor section 13 to generate pressurized, hot combustion gas that is delivered to the turbine section 15, which is fluidly coupled to the combustor section 13.

The turbine section 15 can in turn include several turbine sub-sections in sequence. In exemplary embodiments disclosed herein, the turbine section 15 can include a high-pressure turbine section 61, arranged directly downstream of the combustor section 13. An intermediate-pressure turbine section 63 can be arranged downstream of the high-pressure turbine section 61. Moreover, a power turbine section 65, also referred to as low-pressure turbine section 65, can be arranged downstream of the intermediate-pressure turbine section 63. For the reasons which will become apparent later on, the power turbine section 65 can be referred to also as "free power turbine section" and can include a "free power turbine" or "free turbine". The free turbine, includes a free turbine rotor, also referred to as low-pressure turbine rotor or power turbine rotor, and a free turbine stator, also referred to as low-pressure turbine stator or power turbine stator.

In exemplary embodiments disclosed herein the high-pressure turbine section 61 can include a high-pressure turbine rotor 67 arranged for rotation around the turbine axis A-A. The high-pressure turbine rotor 67 can include a plurality of sets of rotating blades, each set including a plurality of blades arranged in a circular configuration around the turbine axis A-A. In the embodiment of FIG. 2 the high-pressure turbine rotor 67 includes two sets of rotating blades 69. A respective set of stationary blades 71 can be combined with each set of rotating blades 69. A first set of stationary blades 71 is thus arranged between the combustion chamber 47 and the first set of rotating blades 69 of the high-pressure turbine section 61. According to exemplary embodiments of the gas turbine engine 2, the high-pressure turbine section 61 includes two sets of rotating blades 69 and two sets of stationary blades 71, which form two high-pressure turbine stages.

The intermediate-pressure turbine section 63 arranged downstream of the high-pressure turbine section 61 can include an intermediate-pressure turbine rotor 73 arranged in the casing 35 for rotation around the turbine axis A-A. The intermediate-pressure turbine rotor 73 can include a plurality of rotating blades 75 mounted for co-rotation therewith. In some embodiments, as shown in FIG. 2, the rotating blades 75 of the intermediate-pressure turbine rotor 73 can be arranged according to a single set of circumferentially arranged blades. The intermediate-pressure turbine section 63 can further include stationary blades 77. According to exemplary embodiments, as shown in FIG. 2, the stationary blades 77 form a single set of circumferentially arranged stationary blades 77 arranged upstream of the rotating blades 75. The circumferential set of stationary blades 77 and the circumferential set of rotating blades 75 form a single intermediate-pressure turbine stage.

The number of turbine stages shown is by way of example only. In other embodiments, the high-pressure turbine section 61, the intermediate-pressure turbine section 63 or both can include a different number of stages.

The low-pressure compressor section 17, the high-pressure compressor section 19, the combustor section 13, the high-pressure turbine section 61 and the intermediate-pressure turbine section 63 in combination form a gas generator section, cumulatively labeled 66, which generates combustion gas that partly expands in the high-pressure turbine section 61 and in the intermediate-pressure turbine section 63 to generate mechanical power to drive the compressor section 11. The partly expanded combustion gas delivered by the intermediate-pressure turbine section 63 further expands in the low-pressure turbine section 65 to generate useful power made available on a power turbine shaft to be described later on.

The low-pressure turbine section or power turbine section 65 arranged downstream of the intermediate-pressure turbine section 63 can include a low-pressure turbine rotor 81, also referred to as free power turbine rotor or simply power turbine rotor 81, which is arranged in the casing 35 for rotation around the turbine axis A-A. The power turbine section 65 further includes a low-pressure turbine stator, also referred to as free power turbine stator or simply power turbine stator.

Circumferential arrangements of rotating blades 83 can be mounted on the low-pressure turbine rotor 81. In some embodiments, four sets of circumferentially arranged rotating blades 83 are arranged on the low-pressure turbine rotor 81. Each set or arrangement of circumferentially arranged rotating blades 83 is combined with a set or arrangement of circumferentially arranged stationary blades 85, mounted on the casing 35 and forming part of the free power turbine stator, or low-pressure turbine stator. Each pair of sequentially arranged circumferential set of stationary blades 85 and relevant circumferential set of rotating blades 83 forms a respective stage of the low-pressure turbine section 65.

Combustion gas produced in the combustor section 13 expands sequentially in the high-pressure turbine section 61, in the intermediate-pressure turbine section 63 and in the low-pressure turbine section, or power turbine section, 65. The enthalpy drop in the combustion gas in each high-pressure, intermediate-pressure and low-pressure turbine sections generates a corresponding amount of mechanical power, which is exploited as described here below.

The high-pressure compressor rotor 41 and the high-pressure turbine rotor 67 are both mounted on or constrained to a first turbine shaft 91, for co-rotation therewith around the turbine axis A-A. The combination of the high-pressure compressor rotor 41, the high-pressure turbine rotor 67 and the first turbine shaft 91 form a first spool of the gas turbine engine. Sometimes, these three components are referred to cumulatively as a "first rotor" or "high-pressure rotor" of the gas turbine engine 2.

The high-pressure compressor rotor 41, the first turbine shaft 91 and the high-pressure turbine rotor 67 rotate at the same rotational speed. Mechanical power generated in the high-pressure turbine section 61 by expansion of the combustion gas between the pressure in the combustion chamber 47 and an intermediate pressure at the inlet of the intermediate-pressure turbine section 63 is used to rotate the high-pressure compressor rotor 41 and thus to boost the air pressure from the delivery pressure at the delivery side of the low-pressure compressor section 17 up to the air pressure at the inlet of the combustor section 13.

The low-pressure compressor rotor 27 and the intermediate-pressure turbine rotor 73 are both mounted on a second turbine shaft 92, for co-rotation therewith around the turbine axis A-A. The combined low-pressure compressor rotor 27, intermediate-pressure turbine rotor 73 and second turbine shaft 92 form a second spool of the gas turbine engine 2. Sometimes, these three components are referred to cumulatively as a "second rotor" or "intermediate-pressure rotor" of the gas turbine engine 2.

The low-pressure compressor rotor 27 and the intermediate-pressure turbine rotor 73 are thus mechanically coupled to one another and rotate at the same speed. Mechanical power generated by expanding gas through the intermediate-pressure turbine section 63 is used to rotate the low-pressure compressor rotor 27. Mechanical power generated by gas expansion in the intermediate-pressure turbine section 63 is thus exploited to boost the pressure of air ingested by the gas turbine engine 2 from the ambient pressure to a first air pressure which is achieved in the air flow passage 21 that fluidly connects the delivery side of the low-pressure compressor section 17 and the high-pressure compressor section 19 to one another.

The first turbine shaft 91 is coaxial to the second turbine shaft 92. The first turbine shaft 91 is internally hollow, such that the second turbine shaft 92 extends through the first turbine shaft 91 and projects at both ends of the first turbine shaft 91 beyond opposite first and second ends of the first turbine shaft 91 and beyond the high-pressure compressor rotor 41 and the high-pressure turbine rotor 67, respectively.

With the above described arrangement, the first spool, including the high-pressure compressor rotor 41, the first turbine shaft 91 and the high-pressure turbine rotor 67 rotates at a first rotational speed. The second spool, including the low-pressure compressor rotor 27, the second turbine shaft 92 and the intermediate-pressure turbine rotor 73 rotates at a second rotational speed, which can be different from the first rotational speed.

The first and second spool in combination with the combustor section 13 are cumulatively referred to also as the "super-core" or the "gas generator" of the gas turbine engine 2. The first spool and the combustor section 13 in combination are cumulatively also referred to as the "core" of the gas turbine engine 2.

The low-pressure turbine rotor or free power turbine rotor 81 can be mounted on a power turbine shaft 93 for co-rotation therewith in the casing 35. Here on the power turbine shaft 93 will also be referred to as the third turbine shaft 93. The third turbine shaft 93 can be drivingly coupled to the shaft line 6 of the load driven by the gas turbine engine 2, in the exemplary configuration of FIG. 1 the compressor train 3. The third turbine shaft 93 is axially aligned to the first turbine shaft 91 and the second turbine shaft 92, but external thereto and mechanically separated therefrom.

By the above arrangement, the high-pressure compressor section 19 and the high-pressure turbine section 61 are mechanically coupled through the first turbine shaft 91 as well as fluidly coupled through the flow passage extending across the combustor section 13. The low-pressure compressor section 17 and the intermediate-pressure turbine section 63 are mechanically coupled through the second turbine shaft 92 and further fluidly coupled by the flow path extending through the high-pressure compressor section 19, the combustor section 13 and the high-pressure turbine section 63.

Conversely, the low-pressure turbine section 65, or power turbine section 65, is only fluidly coupled to the intermediate-pressure turbine section 63, but is mechanically separated, i.e. uncoupled with respect to the first spool and the second spool. For this reason, the power turbine section 65 is also referred to as free power turbine section 65, since the turbine rotor thereof can rotate separately from the first spool and the second spool, at a rotational speed different from the rotational speed of the core and super-core of the gas turbine engine.

The power turbine section 65 and the power turbine shaft 93, or third turbine shaft 93, form a "half-spool", which can rotate at a third rotational speed, which may be different from the first rotational speed of the first spool and/or from the second rotational speed of the second spool.

The first turbine shaft 91 and/or the second turbine shaft 92 and/or the third turbine shaft 93 can be supported by a plurality of bearings. In some embodiments one, some or preferably all bearings supporting the first turbine shaft 91 are rolling bearings, rather than hydrostatic bearings, magnetic bearings or hydrodynamic bearings. Similarly, in some embodiments one, some or preferably all bearings supporting the second turbine shaft 92 are rolling bearings, rather than hydrostatic bearings, magnetic bearings or hydrodynamic bearings. Also, in some embodiments one, some or preferably all bearings supporting the third turbine shaft 93 are rolling bearings, rather than hydrostatic bearings, magnetic bearings or hydrodynamic bearings.

A "rolling bearing" as used herein, and as commonly understood in the art, is a bearing including a first bearing component, or race, for co-rotation with the supported shaft and a second bearing component, or race, constrained to a supporting structure, which may be stationary, and further including rolling bodies, between the first bearing component and the second bearing component, which roll between and in contact with the first bearing component and the second bearing component to reduce friction therebetween.

Rolling bearings are particularly advantageous as they require a limited amount of lubricant oil compared to hydrostatic or hydrodynamic bearings. Furthermore they are simpler and subject to less maintenance than magnetic bearings. Therefore they require less space for ancillary equipment.

In some embodiments, one, some or all the first turbine shaft, second turbine shaft and third turbine shaft are supported by at least two radial bearings and at least one axial or thrust bearing. A "radial bearing" as used herein may be understood as a bearing having mainly a radial-load supporting capability, i.e. which is specifically configured to support loads oriented in a direction mainly orthogonal to the rotation axis of the bearing. An "axial bearing" or "thrust bearing" as used herein may be understood as a bearing having mainly an axial-load bearing capability, i.e. which is specifically configured to support a thrust or load oriented parallel to the rotation axis of the bearing.

The first turbine shaft 91 can be supported by a first, axial rolling bearing 101, for instance a ball bearing. The first turbine shaft 91 can be further supported by a second, radial rolling bearing 102. The bearings 101 and 102 can be arranged at a first end of the first turbine shaft 91. A third, radial rolling bearing 103 can be further arranged for supporting the first turbine shaft 91 at the second end thereof. In some embodiments the second, radial bearing 102 and the third, radial bearing 103 can be a roller bearing. In some embodiments the first, axial bearing 101 may also have a radial load capability, in combination with an axial load capability, i.e. it can be adapt to support combined radial and axial loads.

In some embodiments the first, axial bearing 101 can be located at or near the upstream end of the first turbine shaft 91, i.e. the end facing the low-pressure compressor section. In exemplary embodiments, the second, radial bearing 102 can be located at or near the upstream end of the first turbine shaft 91. The third, radial bearing 103 can be located near the downstream end of the first turbine shaft 91, i.e. the end facing the low-pressure turbine section 65.

In some embodiments the first, axial bearing 101 can be arranged between the second, radial bearing 102 and the third, radial bearing 103. In other embodiments, as shown in FIG. 2, the second, radial bearing 102 can be arranged between the first, axial bearing 101 and the third, radial bearing 103.

The second turbine shaft 92 can be supported by a fourth rolling bearing 104, for instance a roller bearing. The second turbine shaft 92 can be further supported by a fifth rolling bearing 105. A sixth rolling bearing 106 can be further arranged for supporting the second turbine shaft 92. In some embodiments the fourth bearing 104 and the sixth bearing 106 can be radial bearings. In some embodiments the fifth bearing 105 may be an axial bearing, i.e. a thrust bearing. In some embodiments the fifth, axial bearing 105 may also have a radial load capability, in combination with an axial load capability, i.e. it can be adapt to support combined radial and axial loads.

Two rolling bearings supporting the second turbine shaft 92 can be arranged at one end of the second turbine shaft 92, and one rolling bearing supporting the second turbine shaft 92 can be arranged at another end of the second turbine shaft 92. For instance two rolling bearings can be arranged at or near the upstream end of the second turbine shaft 92, i.e. the end extending upstream of the first turbine shaft 91 and another rolling bearing can be arranged at or near the downstream end of the second turbine shaft 92, i.e. the shaft end extending downstream of the first turbine shaft 91. In exemplary embodiments shown in FIG. 2 the fourth, radial bearing 104 is arranged at the low-pressure compressor rotor 27. The fifth, axial bearing 105 is arranged at the low-pressure compressor rotor 27. The sixth, radial bearing 106 can be arranged at or near the intermediate-pressure turbine rotor 73.

By arranging bearings 103 and 106 in one and the same sump arrangement, the need of another supporting frame between intermediate-pressure turbine rotor 73 and low-pressure turbine rotor 81 can be avoided.

Both the high-pressure compressor rotor 41 and the high-pressure turbine rotor 67 can thus be supported by the first turbine shaft 91 in an in-between bearings configuration, i.e. between a first group of bearings, e.g. bearings 101 and 102, and a second group of bearings, including only bearing 103, positioned near the end of the first turbine shaft 91 facing the free power turbine section, i.e. the low-pressure turbine section 65.

The intermediate-pressure turbine rotor 73 and the low-pressure compressor rotor 27 mounted on the second turbine shaft 92 can be supported according to a partly overhung configuration, i.e. on bearing 106 and on bearings 104 and 105, respectively.

In some embodiments the low-pressure turbine rotor, or power turbine rotor 81 is mounted in an overhung configuration on the third, power turbine shaft 93. In exemplary embodiments the low-pressure turbine rotor 81 can be mounted on a first upstream end of the third turbine shaft 93, which is facing the intermediate-pressure turbine rotor 73. The second, opposite end of the third turbine shaft 93, schematically shown at 94, is a load coupling end, adapted to be mechanically coupled to the shaft line 6 and to the driven load. The third turbine shaft 93 can be supported by three rolling bearings, namely a seventh bearing 107, an eighth bearing 108, and a ninth bearing 109. The three bearings 107, 108, 109 supporting the third turbine shaft 93 can be arranged on one and the same side of the low-pressure turbine rotor 81, i.e. between the low-pressure turbine rotor 81 and the load coupling end 94 of the third turbine shaft 93. In particularly preferred embodiments, the seventh bearing 107 and the ninth bearing 109 can be radial bearings, while the intermediate eighth bearing 108 can be an axial or thrust bearing.

By arranging the bearings of the third turbine shaft 93 on the side opposite the high-pressure and intermediate-pressure turbine sections, the bearings are better protected against contaminants, in particular during maintenance interventions on the gas turbine engine. More specifically, the bearings of the third turbine shaft 93 are best protected against polluting contaminants for instance when the core and super-core of the gas turbine engine are opened and/or removed, for instance for maintenance, repair or replacement.

According to the present disclosure, features and arrangements can be used to reduce the axial load on the third turbine shaft 93, i.e. the power turbine shaft supporting the power turbine rotor 81. By reducing the axial load on the third turbine shaft 93, high turbine power rates, e.g. in the range of 40 MW or above, for instance 60 MW or above, such as 65 MW or above, under ISO-day conditions, can be achieved more easily, without resorting to hydrodynamic or hydrostatic thrust bearings. Reduced thrust on the shaft allows using rolling bearings instead or more complex fluid bearings and relevant ancillary equipment. The above mentioned power ranges are by way of example only. It shall be understood that gas turbine engines having different power rates, for instance smaller power rates, can be foreseen.

Figure 3:
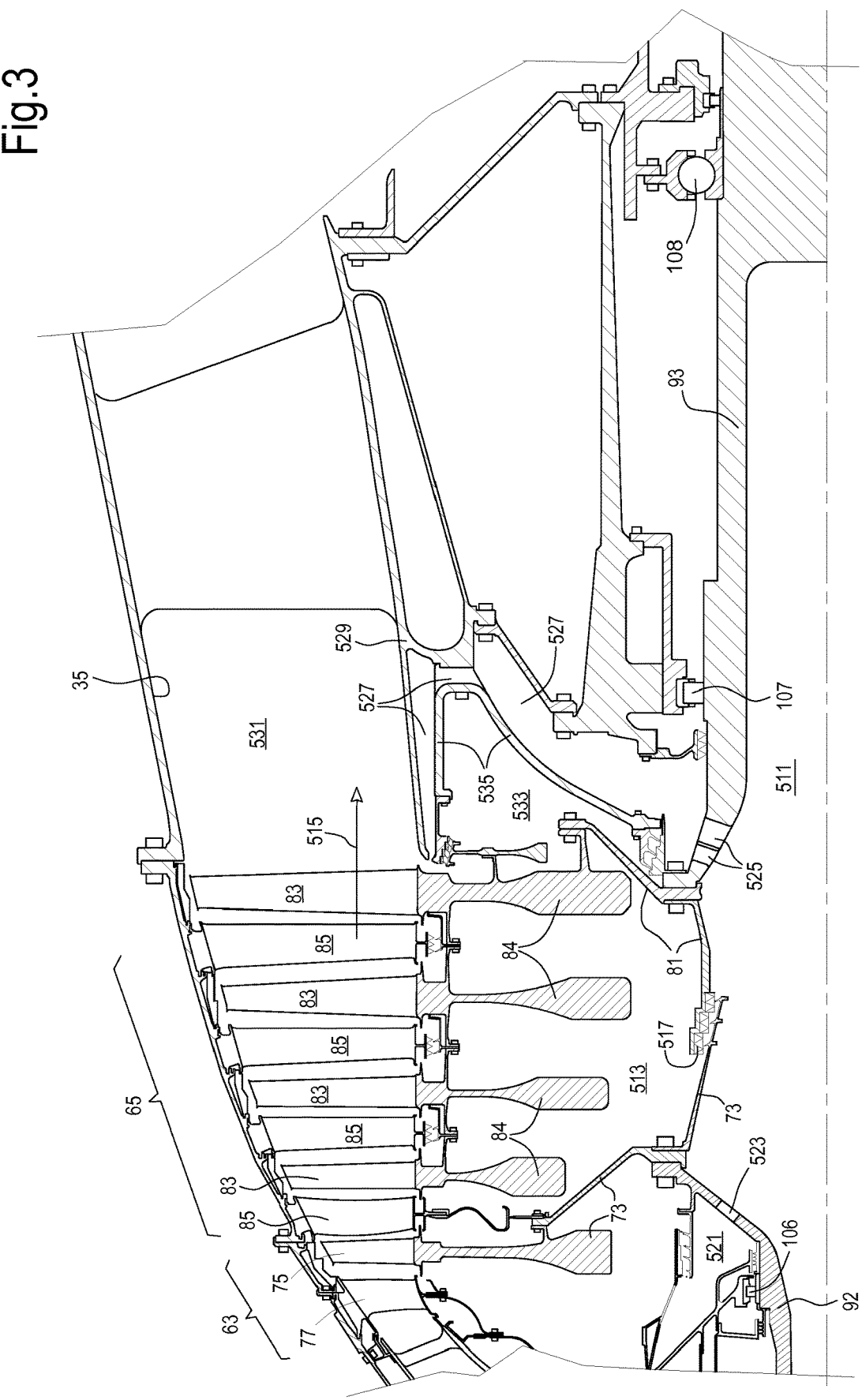
FIG. 3 illustrates an enlarged and more detailed sectional view of a portion of the turbine section of a gas turbine engine according to the present disclosure.
Figure 4:
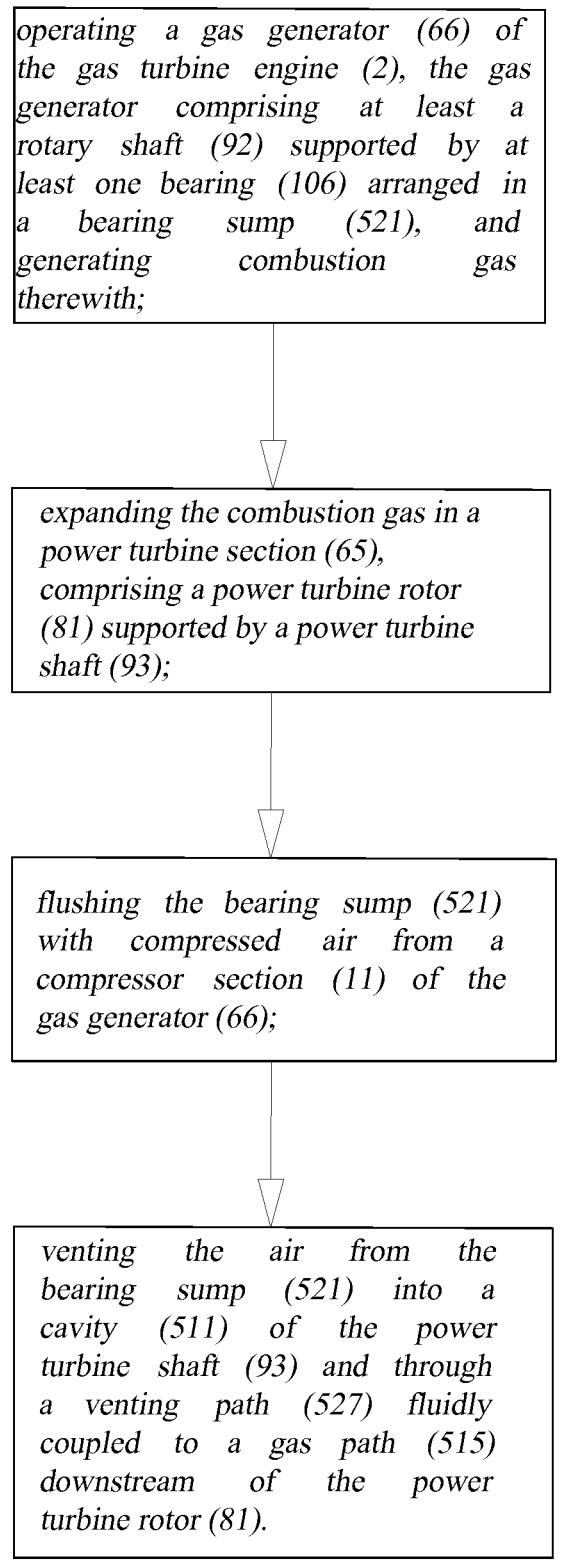
FIG. 4 illustrates a flowchart summarizing a method of the present disclosure.

With continuing reference to FIGS. 1 and 2, while FIG. 2 illustrates the main sections and components of the gas turbine engine 2 in a somewhat schematic way, FIG. 3 illustrates in more detail an enlarged sectional view of a portion of the turbine section 15 in an embodiment according to the present disclosure.

As shown in FIG. 3, the third turbine shaft 93, or power turbine shaft 93, can be provided with an axial cavity 511, which can be configured as a dead hole and which can extend axially through the low-pressure turbine rotor 81 and can open towards the intermediate-pressure turbine rotor 73. The axial cavity 511 can collect pressurized air leaking from a cavity 513 of the low-pressure turbine rotor 81. The cavity 513 houses discs 84 of the low-pressure turbine rotor 81, on which the rotating blades 83 of the low-pressure turbine section 65 are mounted.

The cavity 513 is usually pressurized with air from the compressor section 11. The pressure in cavity 513 is usually slightly above the highest pressure in the flow path 515 of the combustion gas through the low-pressure turbine section 65. Pressurization of the cavity 513 prevents hot combustion gas from contacting the components of the low-pressure turbine rotor 81, other than the rotor blades. This can be beneficial, since, while the turbine blades are usually made of highly performing materials suitable to withstand high temperatures, the most internal portions of the rotor can be made of less expensive, less performing materials, unsuitable to remain in contact with high temperature combustion gas.

The air pressure in the cavity 513 increases the forward thrust applied on the third turbine shaft 93 and thus negatively affects the load on the axial bearing 108 of the third turbine shaft 93.

In order to reduce the negative effect of the air pressure in cavity 513 on the axial thrust applied on the third turbine shaft 91, the diameter of the pressure cavity 513 is reduces by increasing the diameter of the third turbine shaft 91 in the region where the axial cavity 511 is located.

A rotating vent seal 517 is provided between the third turbine shaft 93, integral with the low-pressure turbine rotor 81, and the second turbine shaft 92, integral with the intermediate-pressure turbine rotor 73. Pressurized air leaking through the rotating vent seal 517 is thus collected in the axial cavity 511 of the third turbine shaft 93.

The axial cavity 511 can be fluidly coupled to a bearing sump of a bearing supporting the second turbine shaft 92. Specifically, the axial cavity 511 can be fluidly coupled to a bearing sump 521 where the sixth rolling bearing 106 is arranged. The bearing sump 521, similarly as other bearing sumps of the gas turbine engine 2, can be flushed with pressurized air from the compressor section 11, to prevent hot combustion gas from contacting the bearing housed in the sump and damaging the lubrication oil or the mechanical components of the bearing. The pressurized air delivered to the bearing sump must be vented such that a continuous air flow can be maintained in the bearing sump to protect the bearing against the high temperature of the hot combustion gas.

According to some embodiments, air venting ports 523 are provided in the intermediate-pressure turbine rotor 73. The air venting ports 523 place the sump 521 in fluid communication with the axial cavity 511 of the third turbine shaft 93.

Air collected in the axial cavity 511, which can include leakage air from the rotating vent seal 517, as well as air from the bearing sump 521, can be discharged from the axial cavity 511, through air venting ports 525 and an air venting path 527, which extends through a stationary portion 529 of the gas turbine engine 2. The air venting path 527 can lead in an end portion 531 of the gas flow path, for instance directly downstream of the last stage of the low-pressure turbine section 65. The pressure in the end portion 531 of the gas flow path can be below ambient pressure, such that efficient air venting from the bearing sump 521 can be ensured under all operating conditions of the gas turbine engine 2, even under partial load conditions. Efficient venting is specifically maintained also when the gas turbine engine 2 is operating below its design point, for instance at or below 80% of the rated power, e.g. at or around 70% of the rated power.

In addition to providing an efficient venting path for the air from the bearing sump 521, as mentioned above, the axial cavity 511 in the third gas turbine shaft 93 reduces the volume of the cavity 513 of the low-pressure turbine rotor 81 and therefore the total area on which the pressure of the air contained in cavity 511 is applied, since part of the interior of the low-pressure turbine rotor 81 is occupied by the axial cavity 511 of the third turbine shaft 93. Thus, the axial thrust generated by the air pressure in the cavity 513 on the third turbine shaft 93, and on the axial or thrust bearing 108, is reduced.

According to some embodiments, in order to further reduce the axial thrust on the third turbine shaft 93, the gas turbine engine 2 can be provided with a balance piston cavity 533. In some embodiments, the balance piston cavity 533 can be arranged in front of the low-pressure turbine rotor 81, i.e. on the side thereof, opposite the intermediate pressure turbine section 63. For instance, the balance piston cavity 533 can be arranged between a stationary diaphragm 535 integral with the casing 35, and a front surface of the low-pressure turbine rotor 81, i.e. a surface of the low-pressure turbine rotor 81 facing the load coupling end 94 of the third turbine shaft 93.

Pressurized air from the compressor section 11 can be delivered in the balance piston cavity 533 through passages (not shown) formed in the casing and in the stationary portion of the gas turbine engine 2. The pressure inside the balance piston cavity 533 generates an axial thrust on the low-pressure turbine rotor 81, which is directed opposite to the thrust generated by the air pressure in the rotor cavity 513 and by the axial load generated by the combustion gas expanding through the low-pressure turbine 65.

In some embodiments the balance piston cavity 533 can be arranged between the air venting path 527 and the low-pressure turbine rotor 81, such that the air venting path 527 is formed in a stationary portion of the gas turbine engine 2, behind the balance piston cavity 533, between this latter and the load coupling end 94 of the third turbine shaft 93. The air venting path 527 thus extends around the balance piston cavity 533 on the side thereof opposite the low-pressure turbine rotor.

In other embodiments a balance piston cavity can be arranged in a different position around the low-pressure turbine section 65, as known to those skilled in the art.

While the invention has been described in terms of various specific embodiments, it will be apparent to those of ordinary skill in the art that many modifications, changes, and omissions are possible without departing form the spirt and scope of the claims.

The invention claimed is:

1. An aeroderivative gas turbine engine comprising:
 a gas generator comprised of a compressor section and a gas generator shaft;
 at least one bearing to support the gas generator shaft;
 a bearing sump fluidly coupled to the compressor section and housing the at least one bearing therein;
 a power turbine section having a power turbine rotor supported by a power turbine shaft, the power turbine section fluidly coupled to the gas generator but mechanically uncoupled from the gas generator to enable the power turbine rotor to rotate separately with respect to the gas generator shaft, the power turbine shaft having an axial cavity therein fluidly coupled to the bearing sump; and
 an air venting path extending from the axial cavity and leading a combustion gas flow path downstream of the power turbine rotor.

2. The gas turbine engine of claim 1, wherein the gas generator comprises at least a high-pressure turbine section comprised of a first turbine shaft, and an intermediate-pressure turbine section comprised of a second turbine shaft supported by said at least one bearing.

3. The gas turbine engine of claim 1, wherein the gas generator comprises:
 a high-pressure turbine section and a high-pressure compressor section drivingly coupled to one another by a first turbine shaft;
 an intermediate-pressure turbine section and a low-pressure compressor section drivingly coupled to one another by a second turbine shaft, the first turbine shaft and the second turbine shaft) being coaxially arranged, the second turbine shaft extending through the first turbine shaft; and
 a combustor section fluidly coupled to the high-pressure compressor section and to the high-pressure turbine section.

4. The gas turbine engine of claim 3, wherein the at least one bearing arranged in the bearing sump supports the second turbine shaft.

5. The gas turbine engine of claim 1, wherein a balance piston cavity is provided on a side of the power turbine rotor opposite the gas generator.

6. The gas turbine engine of claim 5, wherein the air venting path (527) extends radially on the side of the balance piston cavity opposite the power turbine rotor.

7. The gas turbine engine of claim 1, wherein the power turbine shaft is supported by rolling bearings.

8. The gas turbine engine of claim 1, wherein the power turbine rotor is mounted in an overhung configuration on the power turbine shaft, and the power turbine shaft is supported by bearings arranged on a side of the power turbine rotor opposite the gas generator.

9. A method of operating a gas turbine engine, comprising the following steps:
- operating a gas generator of the gas turbine engine, the gas generator comprising at least a rotary shaft supported by at least one bearing arranged in a bearing sump and generating combustion gas therewith, the at least one rotary shaft rotating at a first speed;
- expanding the combustion gas in a power turbine section comprising a power turbine rotor supported by a power turbine shaft which is mechanically uncoupled from the gas generator, the power turbine rotating at a speed different than the first speed;
- flushing the bearing sump with compressed air from a compressor section [[11) of the gas generator; and
- venting the air from the bearing sump into a cavity of the power turbine shaft and through a venting path fluidly coupled with a combustion gas flow path downstream of the power turbine rotor.

* * * * *